No. 779,477.

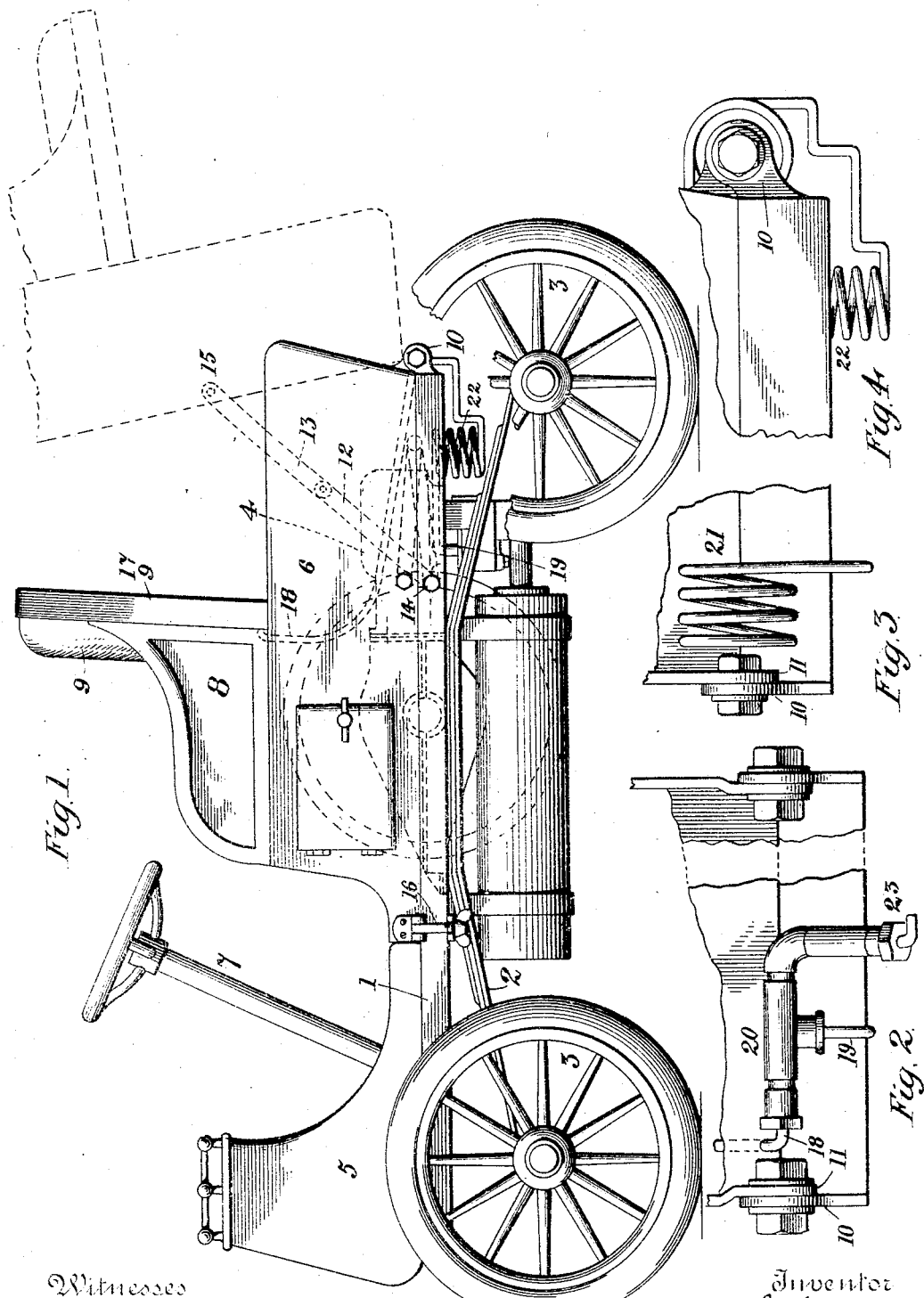

Patented January 10, 1905.

UNITED STATES PATENT OFFICE.

EDWARD R. HEWITT, OF NEW YORK, N. Y.

AUTOMOBILE.

SPECIFICATION forming part of Letters Patent No. 779,477, dated January 10, 1905.

Application filed March 23, 1904. Serial No. 199,659.

*To all whom it may concern:*

Be it known that I, EDWARD R. HEWITT, a citizen of the United States, residing at the city of New York, in the borough of Manhattan and State of New York, have invented certain new and useful Improvements in Automobiles, of which the following is a full, clear, and exact description.

This invention relates to automobiles, and has special reference to that type of vehicle in which the engine is mounted at or near the middle of the vehicle, beneath the body, as distinguished from those in which the engine is located under a hood at the forward part of the frame or at some other point exterior to the main body. There being various advantages derived from placing the engine at the middle of the vehicle, it becomes desirable to make it as readily accessible at that location as elsewhere for the purpose of inspection and repair.

Hence it is one object of this invention to provide a construction affording ready and complete exposure of the engine when located at a mid-position beneath the vehicle-body.

Another object of the invention is to provide for carrying the gasolene at a point on the vehicle-body where it will be remote from the engine and not occupy valuable space, but so arranged that the shifting of the vehicle-body to expose the engine will not disarrange the tubular connection between the gasolene-tank and the engine or require temporary disconnection thereof.

In the accompanying drawings, Figure 1 is a side elevation of an automobile embodying my improvements. Fig. 2 is a detail of the rear end of the automobile, showing the body hinged to the running-gear and also showing a movable joint in an oil-feed pipe. Fig. 3 is a rear view, and Fig. 4 is a side view, of a form of the invention in which a portion of the supply-pipe is formed into a long coil which is sufficiently yielding to accommodate the tilting movement of the carriage-body upon its hinge.

In the several views like parts are identified by like signs.

The running-gear may be of any suitable construction, comprising, for instance, a frame 1, springs 2, and wheels 3. The automobile may be driven by an engine 4, mounted upon the running-gear at an approximately mid-position thereon. Upon the running-gear are mounted front and rear body portions 5 and 6, the former usually supporting the steering-gear 7 and the latter comprising a seat 8, having a back 9. The rear body portion covers the engine; but to render the latter accessible for inspection and other purposes I hinge the body 6 to the frame 1 of the running-gear, preferably by means of ears 10, provided upon the rear end of said frame 1, and ears 11, provided upon the lower rear portion of the body. The latter may be tilted upon said hinge to the dotted-line position at Fig. 1, thereby giving free access to all parts of the engine. A foldable support for the tilted body may be provided, comprising links 12 and 13, hinged together and pivoted to the frame at 14 and to the body at 15. One such device may be placed at each side of the body, if desired, and when out of use may fold within the body, as seen in dotted lines at Fig. 1. The body may be normally secured to the running-gear by thumb-bolts or other fasteners 16, one at each side of the vehicle.

Upon or within the back of the seat I secure a tank 17 for gasolene or other motive fluid, and from this tank I lead a feed-pipe 18 to the vicinity of the body-hinge and thence to the carbureter, as at 19. This pipe may be flexible to an extent to accommodate the tilting movement of the body and tank, and one method of rendering it flexible is shown at Fig. 2, in which the pipe is seen to comprise a movable joint or coupling at 20 substantially in line with the axis of the body-hinge, said coupling connecting the portions 18 and 19 of the pipe. Another way of making it sufficiently flexible for the purpose is illustrated at Figs. 3 and 4, in which the fuel-feed pipe includes in the vicinity of the body-hinge a portion which is formed into a coil 21, the coil being sufficiently flexible to accommodate the tilting movements of the body. It will be understood that by the use of a flexible or jointed connection the tank remains in communication with the engine when the body is lifted. Between the hinge portion and the engine the feed-pipe is coiled, as seen at 22, to take up the jarring of the vehicle and relieve the pipe from any injurious effects therefrom. A drain-pipe may also be provided at 23 for drawing off gasolene from the tank. It will be observed that the tank is remotely located from the engine, so that in case of accident flame will be unlikely to reach the tank, and any leakage from the tank will be shed from the sides of the vehicle-body, and so shunted from contact with the engine.

Variations may be resorted to within the scope of my invention, and portions of my improvements may be used without others.

Having described my invention, I claim—

1. An automobile comprising a running-gear, an engine, and front and rear body portions, the rear body portion covering the engine and being hinged so that it may be lifted up to expose the engine, and the front body portion being fixed upon the running-gear, and means for securing the rear body portion in normal position.

2. An automobile comprising a running-gear, an engine thereon, a body covering the engine and hinged so that it may be raised to expose the engine, a tank upon said body, and a flexible communication from said tank to the engine, whereby the tank remains in communication with the engine when the body is lifted.

3. An automobile comprising a running-gear, an engine thereon, a body covering the engine and provided with a hinge whereby it may be moved to expose the engine, a tank upon said body, and a pipe extending from the tank to the vicinity of the hinge and thence to the engine, and having a movable joint which accommodates the hinge movement of the body.

4. An automobile comprising a running-gear, an engine thereon, a body covering the engine and provided with a hinge whereby it may be moved to expose the engine, a tank upon said body, and a pipe extending from the tank to the vicinity of the hinge and thence to the engine, and having a movable joint substantially in line with said hinge and also including a jar-absorbing coil between said joint and the engine.

5. An automobile comprising a running-gear, an engine thereon, front and rear body portions, the rear portion covering the engine and being hinged so that it may be moved off to expose the engine, a tank upon said hinged body portion, and communicating means between the tank and the engine, said communicating means including a movable joint in the vicinity of said hinge.

6. An automobile comprising a running-gear, an engine thereon, a body covering the engine and provided with means whereby it is rendered movable to expose the engine, a seat provided upon said body and having a back, a tank mounted upon said back, and a communication from the tank to the engine, said body serving to shed from the engine any oil that may accidentally escape from the tank.

7. An automobile comprising a running-gear, an engine thereon, front and rear body portions mounted upon the running-gear, the rear body portion being hinged so that it may be moved off to expose the engine, a seat provided upon said rear body portion and having a back, a tank mounted upon said back, and a communication from said tank to the engine, said communication including a movable joint which accommodates the hinge movement of the rear body portion.

8. An automobile comprising a running-gear, an engine thereon, front and rear body portions, the rear body portion covering said engine and being hinged, a foldable support connected to the running-gear and to the rear body portion, a tank carried by the latter, and a communication between the tank and the engine and including a movable joint for accommodating the movement of the body upon the hinge.

9. An automobile comprising a running-gear, an engine thereon, a seat having a back and provided with means whereby it is hinged to the running-gear, a tank upon said back, and a pipe connecting the tank to the engine and including a construction which accommodates the movement of the seat about the hinge.

10. An automobile comprising a running-gear, an engine thereon, a seat provided with means whereby it is hinged to the running-gear, a tank mounted upon said seat, a pipe connected at one end to the tank and at the other end to the engine, and a rotating joint in said pipe substantially in line with the hinge.

11. An automobile comprising a running-gear, an engine thereon, a cover for the engine, a tank above said cover, means whereby said tank is hinged to the running-gear, and a communication from the tank to the engine.

12. An automobile comprising a running-gear, an engine thereon, a cover for the engine, a tank above said cover, means whereby said tank is hinged to the running-gear, and a communication from the tank to the engine, said communication including a movable joint which accommodates the movement of the tank upon the hinge.

In witness whereof I subscribe my signature in presence of two witnesses.

EDWARD R. HEWITT.

Witnesses:
 FRANK S. OBER,
 WALDO M. CHAPIN.